United States Patent [19]

Davitt, Jr.

[11] 4,219,934

[45] Sep. 2, 1980

[54] ADJUSTABLE HEIGHT GAUGE DEVICE

[76] Inventor: James J. Davitt, Jr., 203 Lee Ann Dr., Easley, S.C. 29640

[21] Appl. No.: 841,523

[22] Filed: Oct. 12, 1977

[51] Int. Cl.² .............................................. G01B 3/46
[52] U.S. Cl. .................................... 33/168 B; 33/170
[58] Field of Search ................. 33/168 B, 164 C, 163, 33/170, 169 R

[56] References Cited
U.S. PATENT DOCUMENTS

| 495,019 | 4/1893 | Carter et al. | 33/164 C |
|---|---|---|---|
| 2,382,759 | 8/1945 | Weiss et al. | 33/164 C |
| 2,596,204 | 5/1952 | Bryson | 33/164 C |

*Primary Examiner*—Willis Little
*Attorney, Agent, or Firm*—Bailey, Dority & Flint

[57] ABSTRACT

An adjustable height gauge device includes a block member having at least one planar end face providing a reference measurement surface and a first bore formed therein for receiving a reciprocating plunger rod. The plunger includes an axial threaded bore which receives a threaded lift screw operated by a turnscrew member carried in a side slot of the block member. The plunger rod accommodates interchangeable extension rods for extending the height range of the device.

3 Claims, 5 Drawing Figures

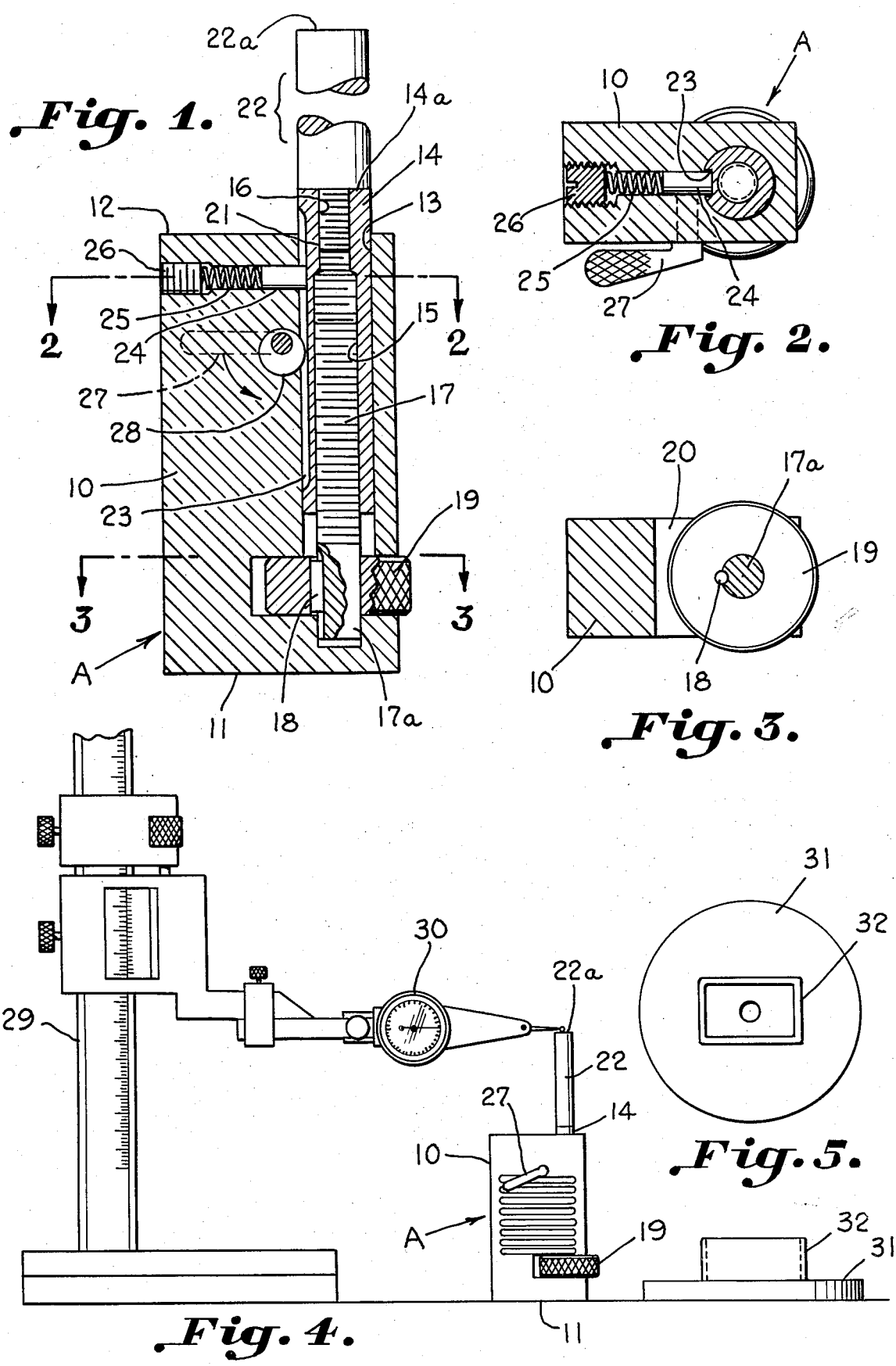

ADJUSTABLE HEIGHT GAUGE DEVICE

BACKGROUND OF THE INVENTION

In material working and machining, it is necessary to precisely set different dimensions on the various machinery being utilized such as milling, turning, drilling and the like machinery. It is customary to utilize a set of precision gauge blocks comprising a number of individual steel gauge blocks having a pair of planar parallel surfaces with the distance therebetween accurately determined. One of the characteristics of such blocks is that the surfaces are made with such precise accuracy that the blocks adhere to one another by molecular attraction when rubbed together. Any number of the blocks may be combined as a single unit to provide a desired height gauge setting. However, the cost of such a set of blocks represents a considerable capital investment and the sets are not readily affordable to operators of small machine shops.

If one of the blocks is accidentally dropped or the surfaces thereof otherwise damaged, the blocks may no longer adhere often destroying the value of the blocks as a set. In many applications an adjustable height gauge is needed but the accuracy of a set of guage blocks is not required and when used for gauging horizontal distances, the arrangements of the gauge blocks are often inconvenient.

Other devices have been heretofore proposed as alternatives for adjustable gauge blocks such as the adjustable gauge devices shown in U.S. Pat. Nos. 2,596,204 and 2,561,164. However, these devices lack the accuracy and functionability to make them a practical height setting and measuring device. The threaded portions of such devices become exposed when the adjustable pins are extended often resulting in damage to the threads decreasing the accuracy of the gauge.

SUMMARY OF THE INVENTION

It has been found that an adjustable height gauge device can be provided by a block member having a reference base provided by a planar end surface. A first bore having a smooth surface is formed in the block member and a reciprocating plunger rod is carried in the bore. A planar surface is formed on an outer free end of the plunger rod providing a second reference point for setting a desired height position. The plunger rod is provided with an internally threaded bore in which a lift screw is received whereby the mating threads which are formed with precision are not exposed to damage. A reduced threaded axial bore is formed in the opposing end of the plunger rod for receiving a threaded end of an extension rod to extend the height range of the gauge. A rotatable turn screw is connected to the lift screw for causing the plunger rod to move in translatory motion in the first bore in response to the rotation thereof.

Accordingly, an important object of the present invention is to provide an adjustable height gauge device that is highly durable and not susceptible to accidental impact damage which would affect its accuracy and utilization.

Another important object of the present invention is to provide an adjustable height gauge device which is highly versatile and accurate and which is readily affordable by all machine shop operators.

Yet another important object of the present invention is to provide a height gauge device which may be adapted to gauge a wide range of height settings.

Still another important object of the present invention is to provide an adjustable height gauge device having precision threads which are completely enclosed and are not exposed to external damage in operation.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a cut-away side elevational view of an adjustable height gauge device constructed in accordance with the present invention;

FIG. 2 is a sectional view taken along line 2—2 of FIG. 1;

FIG. 3 is a sectional view taken along line 3—3 of FIG. 1;

FIG. 4 is an elevational view illustrating the setting of a height position on an adjustable height gauge constructed in accordance with the present invention; and FIG. 5 is a top plan view of a base support which may be utilized with an adjustable height gauge device constructed in accordance with the present invention.

DESCRIPTION OF A PREFERRED EMBODIMENT

The drawing illustrates a preferred embodiment of the invention which has been found to be highly advantageous in gauging and setting work dimensions on material working machinery such as metal and wood working machinery. Such applications include setting a control stop on a lathe, setting the internal or external dimensions when turning work on a lathe, and for setting the drill depth on a drill press machine. The device has the advantage of being small and compact and can be easily carried by an inspector as a reference for checking the set dimensions on the various machinery.

Referring now in more detail to the drawing an adjustable height gauge device A is illustrated as including a block member 10 having opposed planar end faces 11 and 12. A bore member 13 having a smooth surface is formed in the block member 10 and is open at the planar face 12 for receiving a reciprocating plunger rod 14. It will be noted that the planar face 11 provides a reference base for making a desired height setting or measurement.

The plunger rod 14 includes a first axial threaded bore 15 open at one end thereof and a second reduced threaded bore 16 open at the remote end thereof. A lift screw 17 is provided with threads which mate with the threads of the bore 15. The threads are precision formed and in a preferred embodiment, threads of forty threads per inch were provided affording an accuracy of approximately one to two-tenths of a thousandth of an inch. This is gnerally the same thread and accuracy as provided by a micrometer. The free end of 17a of lift screw 17 is keyed by way of a key member 18 to a turn screw member 19. The turn screw 19 is carried in the block member 10 by way of insertion in an open-sided slot 20 which is open on three sides of the block as best illustrated in FIG. 3. Lift screw 17 is rotated by rotation of the turn screw 19 to raise or lower the plunger rod 14.

The turn screw provides a positive drive for the plunger rod 14 as it reciprocates in the smooth bore 15 and may be conveniently operated by one hand while being held thereby.

It will be noted that the outer free end of the plunger rod 14 includes a planar face 14a which provides a second reference point or surface between which the height gauge is set in reference to the base planar face 11. To provide for a wide range of height settings, the threaded bore 16 is provided for receiving a reduced threaded end 21 of an extension rod 22. It is contemplated that a set of extension rods in varying lengths may be provided with the height gauge device so as to be usable over a wide range of heights and distances. The free end of each extension rod would be likewise provided with a planar face 22a which, like face 14a, may be highly polished and machined so as to provide accurate height settings and measurements. It is also contemplated that the free ends of the extension rods may include a threaded bore so that the extension rods may be connected in series.

It has been found that more accurate gauge settings and measurements can be had by limiting the motion of plunger rod 14 to translatory motion without any rotation thereof. To this end, a longitudinal groove 23 is provided in the exterior side of the plunger rod 14 and a spring biased guide pin 24 is carried in a bore 25 in the block member 10 extending into the groove 23. In this manner, the plunger rod 20 is prevented from rotating and rotation of the turn screw 19 and lift screw 17 result in pure translatory motion of the plunger rod. A screw cap 26 is provided for retaining the spring and adjusting the biasing force against the guide pin in the groove.

To assure that the plunger rod 14 remains fixed when set to a desired height, a cam lock is provided and is illustrated as including a cam lever 27 and an eccentric element 28 which is connected to the cam lever 27 and bears against the plunger rod 14 in the area of the groove 23 when the cam lever 27 is pivoted downwardly in the direction of the arrow as shown.

Referring now to FIG. 4, application of the adjustable gauge device A is illustrated wherein a desired height is set on the gauge device as measured between the base 11 and the planar end face 22a of extension rod 22. As illustrated, the reference height is set by utilizing a conventional height gauge 29 which is accurately calibrated and a dial gauge 30 which is utilized to set the height of the gauge A within the desired tolerances. With the height accurately set on the gauge A, the gauge may be carried by an inspector or machine operator for inspecting or checking the working dimension on the machine accordingly. For standardizing the height setting technique, a base member 31 is provided for the height gauge A having an upstanding collar 32 corresponding in shape to the block member 10 so that the base thereof may be inserted in the collar 32. The height of the base 31 may be included in the height setting of the gauge so as to compensate for its positioning in the base. The base also provides safe and convenient storage of the height gauge when not in use.

Thus, it can be seen that a highly durable and advantageous construction for an adjustable height gauge can be had in accordance with the present invention wherein the accuracy and reliability are maintained even upon the accidental dropping or other impacting thereof. The precisioned threaded portions of the device are always isolated during operation and are not exposed to damage by extension of the gauge rod. The gauge is inexpensive yet affords a wide range of height positions. The gauge plunger rod may be raised or lowered in a positive manner by rotating the thumb screw in a one-handed operation. The device is compact and may be carried in the pocket of an inspector locked in a predetermined height position so that inspection of material working machinery can be had in a routine manner.

While a preferred embodiment of the invention has been described using specific terms, such description is for illustrative purposes only, and it is to be understood that changes and variations may be made without departing from the spirit or scope of the following claims.

What is claimed is:

1. An adjustable gauge device comprising:
   a block member having at least one planar end face;
   a first non-threaded bore formed in said block member having a smooth interior surface;
   a reciprocating plunger rod having a smooth non-threaded exterior surface received in said first bore for sliding contact with said smooth interior bore of said block member;
   an open-sided slot formed in said block member;
   an turn screw member carried in said slot;
   a threaded interior axial bore formed in said plunger rod;
   a threaded lift screw member received within and threadably mating with said threaded interior bore of said plunger rod, said lift screw being keyed to said turn screw member so as to effect reciprocation of said plunger rod;
   guide means for limiting the reciprocation of said plunger rod to translatory motion including a longitudinal groove formed in said exterior surface of said plunger rod and a guide pin carried by said block member extending into said groove preventing rotation of said plunger rod during reciprocation; and
   lock means carried by said block member including a releasable cam bearing element extendable into said groove and manually operable cam lever means carried on an exterior of said block member operatively connected to said cam bearing element for selectively urging said cam element against said plunger rod within the area of said groove to lock said plunger rod in a desired height position.

2. The device of claim 1 wherein said groove includes a flatened bottom surface extending longitudinally along said plunger rod affording increased surface engagement with said cam element for positively locking said plunger rod.

3. The device set forth in claim 1 wherein said plunger rod includes a threaded axial bore formed in an outer free end thereof for receiving a reduced threaded end of an extension rod for extending the height range of said gauge.

* * * * *